United States Patent [19]
Czernakowski et al.

[11] Patent Number: 5,567,007
[45] Date of Patent: Oct. 22, 1996

[54] INFANT SAFETY SEAT

[75] Inventors: Waldemar Czernakowski, Blaustein; Hermann Wetter, Ulm, both of Germany; David W. Burleigh, Aldwick, England

[73] Assignees: Britax Romer Kindersicherheit GmbH, Ulm, Germany; Britax-Excelsior Limited, Andover, England

[21] Appl. No.: 397,476

[22] Filed: Mar. 2, 1995

[30] Foreign Application Priority Data

Mar. 24, 1994 [GB] United Kingdom .................. 9405860

[51] Int. Cl.⁶ .................................................. A47C 1/08
[52] U.S. Cl. .................................... 297/250.1; 297/216.11
[58] Field of Search ............................. 297/250.1, 464, 297/482, 485, 216.11

[56] References Cited

U.S. PATENT DOCUMENTS

| 4,500,133 | 2/1985 | Nakao et al. | 297/216.11 X |
| 4,591,208 | 5/1986 | McDonald et al. | 297/256.15 X |
| 4,790,593 | 12/1988 | Davalos et al. | 297/256.15 X |
| 5,052,749 | 10/1991 | Groenendijk . | |

FOREIGN PATENT DOCUMENTS

| 1012049 | 6/1977 | Canada | 297/216.11 |
| 0168966 | 1/1986 | European Pat. Off. . | |
| 0200411 | 12/1986 | European Pat. Off. . | |
| 251242 | 1/1988 | European Pat. Off. | 297/250.1 |
| 0323334 | 7/1989 | European Pat. Off. . | |
| 0504618 | 3/1991 | European Pat. Off. . | |
| 0609890 | 8/1994 | European Pat. Off. . | |
| 1937610 | 2/1971 | Germany . | |
| 8911875 | 1/1990 | Germany . | |

Primary Examiner—Milton Nelson, Jr.
Attorney, Agent, or Firm—Davis & Bujold

[57] ABSTRACT

An infant safety seat for use in a motor vehicle, having a rigid seat back (12), is adapted to be mounted in a vehicle so that a seated occupant faces rearwardly. The side of the seat back (12) facing away from the occupant has a guide (30) for receiving a shoulder portion (24) of an adult seat belt and a clamp (28, 32) for inhibiting movement of the shoulder portion (24) of the adult seat belt relative to the seat back (12). A cover (40) is arranged, when in a closed position, to enclose the guide (30, 32) and to cause engagement of the clamp (26 28).

1 Claim, 4 Drawing Sheets

INFANT SAFETY SEAT

FIELD

This invention relates to an infant safety seat, of the type adapted to be mounted in a vehicle so that a seated occupant faces rearwardly, comprising a rigid seat back and a seat portion the side of the seat back facing away from the occupant having guide means for receiving a shoulder portion of an adult seat belt.

RELATED ART

A safety seat of this type is described in EP-A-0168966. The guide comprises an elongate loop having an opening at an intermediate position along one side so as to permit disengagement of the shoulder portion of the adult seat belt by threading the belt through such opening. It has been found that there is a risk of the shoulder portion of the adult seat belt bouncing out of the guide as the safety seat rebounds from the adult seat befit during sudden deceleration, such as might occur if the vehicle was involved in a collision. It is an object of the present invention to provide a safety seat which is not subject to this disadvantage.

SUMMARY OF THE INVENTION

According to the invention, a safety seat of the type described above has clamping means on the seat back and a cover arranged, when in a closed position to enclose the guide means and to cause engagement of said clamping means so as to inhibit movement of the shoulder portion of the adult seat belt relative to the seat back.

In one form of the invention, the clamping means comprises first and second clamping elements mounted on the seat back, the first clamping element being movable relative to the second clamping element, and the cover carries camming means for moving the first clamping element into a clamping position relative to the second clamping element.

Alternatively, the clamping means may comprise a formation on the edges of the cover arranged to urge the shoulder portion into frictional engagement with the seat back.

DETAILED DESCRIPTION OF THE PREFERRED EMBODIMENT

Figure 1:
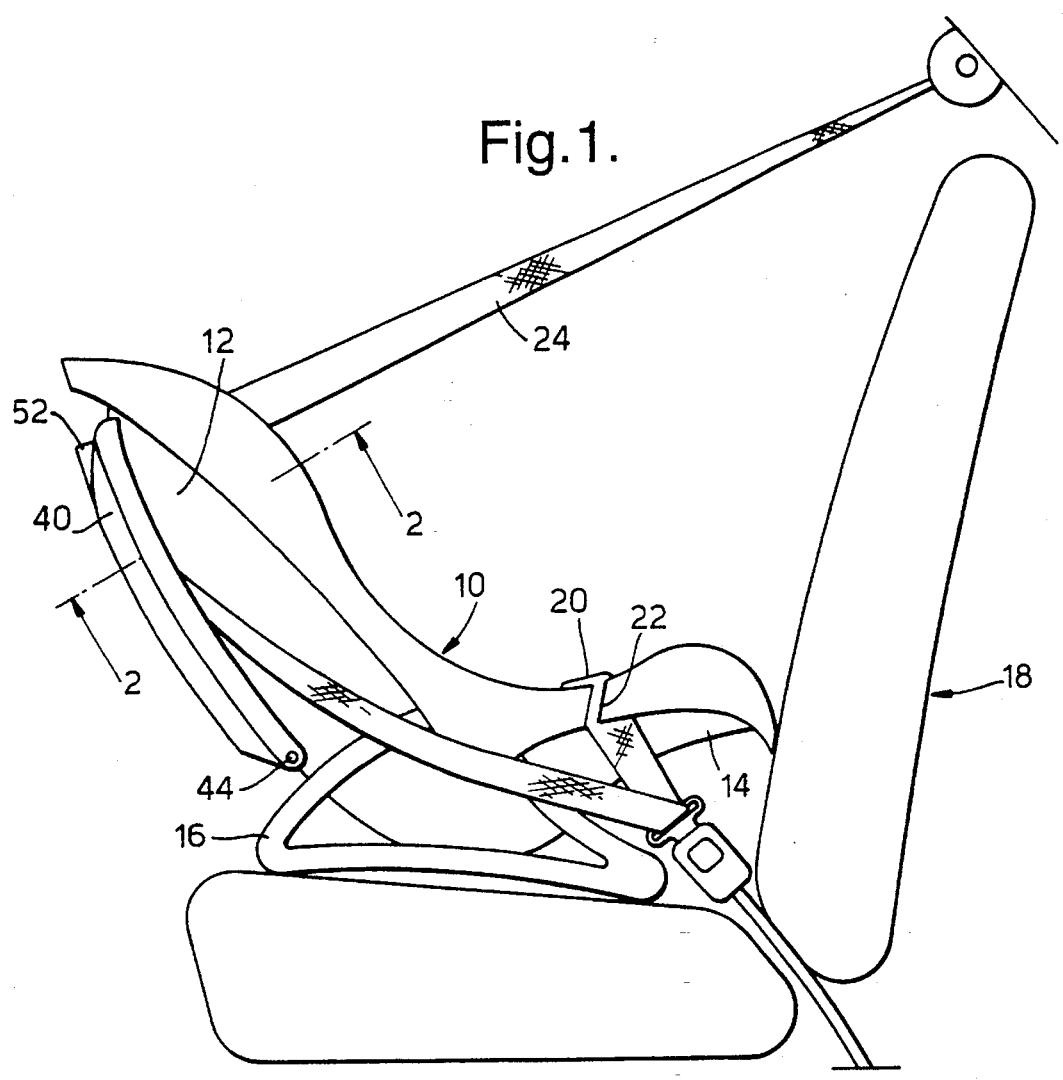
FIG. 1 is a side view of a safety seat in accordance with a first embodiment of the invention, mounted on a vehicle seat, with the cover closed.

The drawings show an infant seat 10 having a seat back 12 and a seat portion 14, together with a base 16 which rests on a vehicle seat 18. The seat 10 is secured in place by an adult seat belt, the lap portion 20 of which engages in guides 22 on the sides of the seat portion 14. The shoulder portion 24 of the adult seat belt engages with a guide comprising a pair of mutually parallel ribs 26 and 28, interconnected by a top stop 30, integrally moulded with the seat back 12, together with a clamp member 32 which fits between the ribs 26 and 28 and has its bottom end coupled thereto by a pivot pin 34 (see FIGS. 2, 5 and 6).

A cover 40 has its bottom edge pivotally attached to the seat back 12 by hinges 42 and 44. A flange 46 extends round the side and upper edges of the cover 40. A pair of ribs 48 and 50 are formed on the inner surface of the cover 40 in alignment with the clamp member 32. When the cover 40 is closed, these ribs 48 and 50 serve as camming means to press the clamp member 32 towards the seat back 12.

Figure 4:
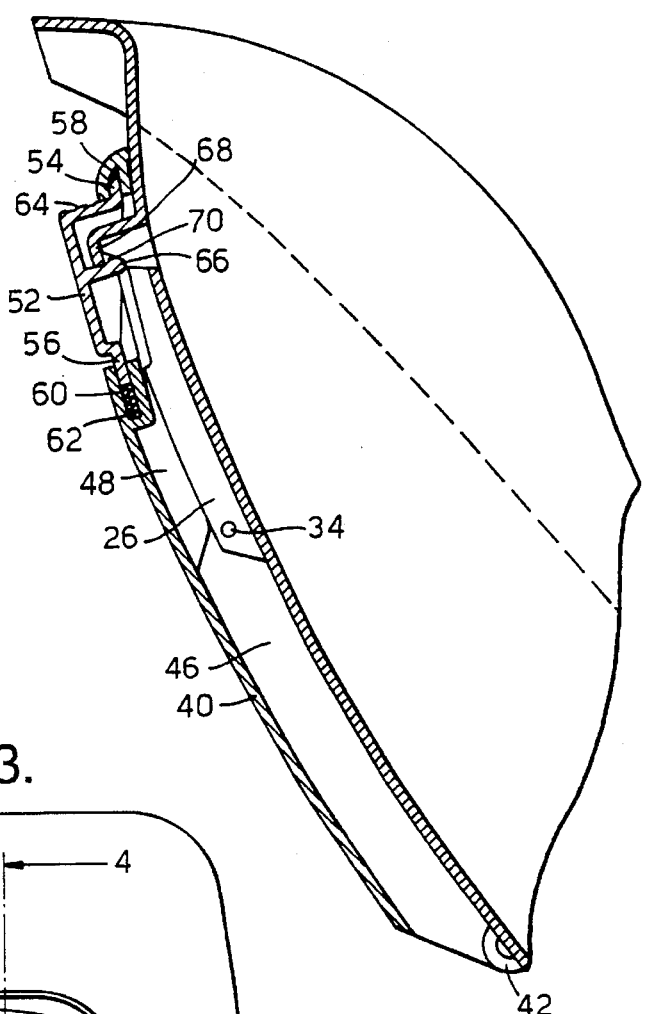
FIG. 4 is a partial cross-sectional view taken on the line 4—4 in FIG. 3, with the vehicle seat belt not shown.
Figure 3:
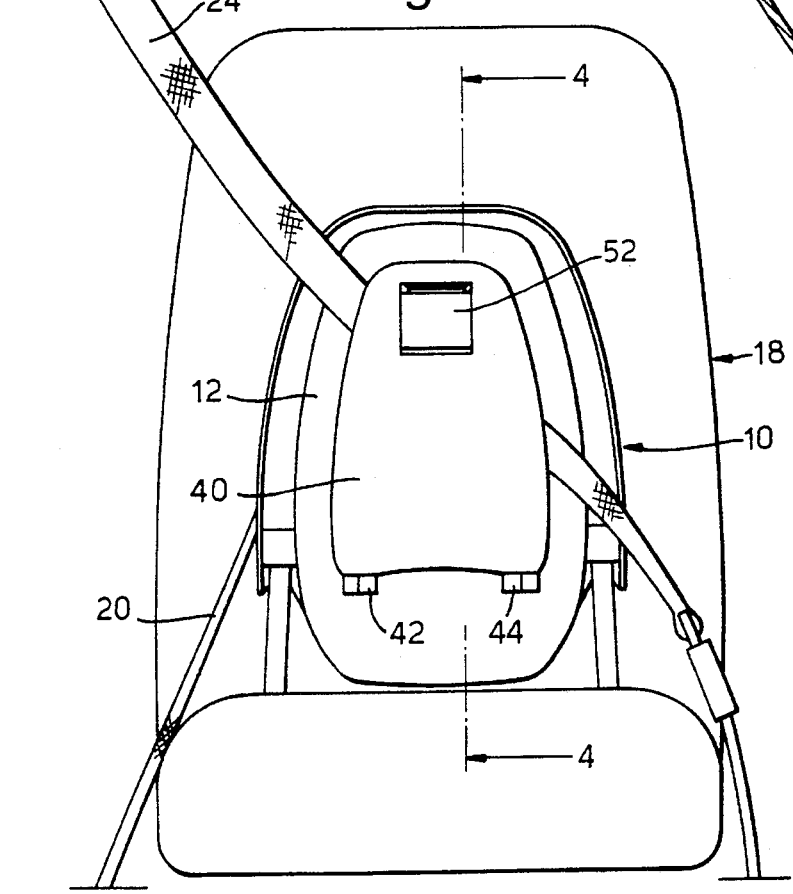
FIG. 3 is a front view of the safety seat shown in FIG. 1.

A sliding catch 52 is mounted on the opposite end of the cover 40 to the hinges 42 and 44. As can be seen from FIG. 4, the catch 52 has flanges 54 and 56 at its outer and inner ends (relative to the axis of the hinges 42 and 44) which are slidably received in respective guideways 58 and 60 in the cover 40. A compression spring 62 in the lower guideway 60 biases the sliding catch 52 away from the hinges 42 and 44 so that a push-button surface 64 thereon abuts against the adjacent end of the outer guideway 60. The sliding catch 52 carries a hook formation 66 which is engageable with a complementary formation 68 on the seat back 14 to hold the cover 40 in its closed position. The hook formation 66 has a ramp surface 70 on its outer end which engages with the complementary formation 68 as the cover 40 is pushed into its closed position to displace the hook formation 66 round the edge of the complementary formation 68 until it can snap into its engaged position.

Figure 2:
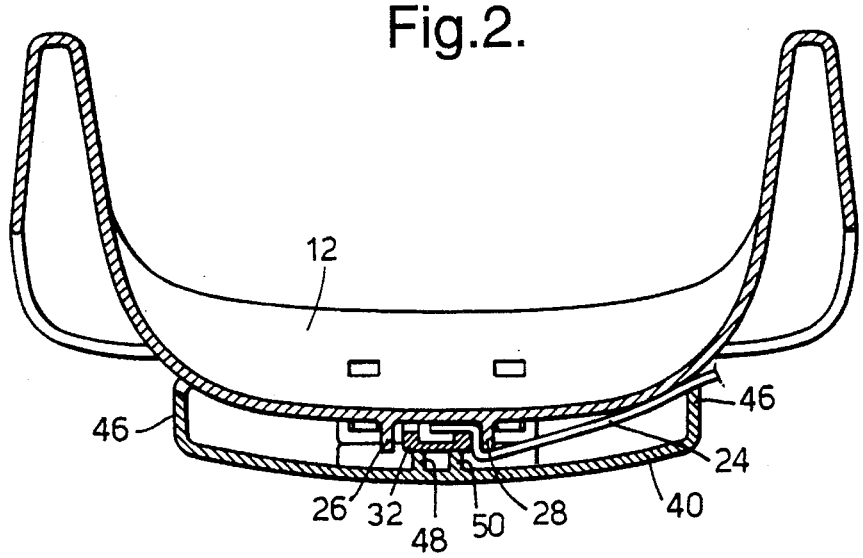
FIG. 2 is a cross-sectional view taken on the line 2—2 in FIG. 1.
Figure 5:
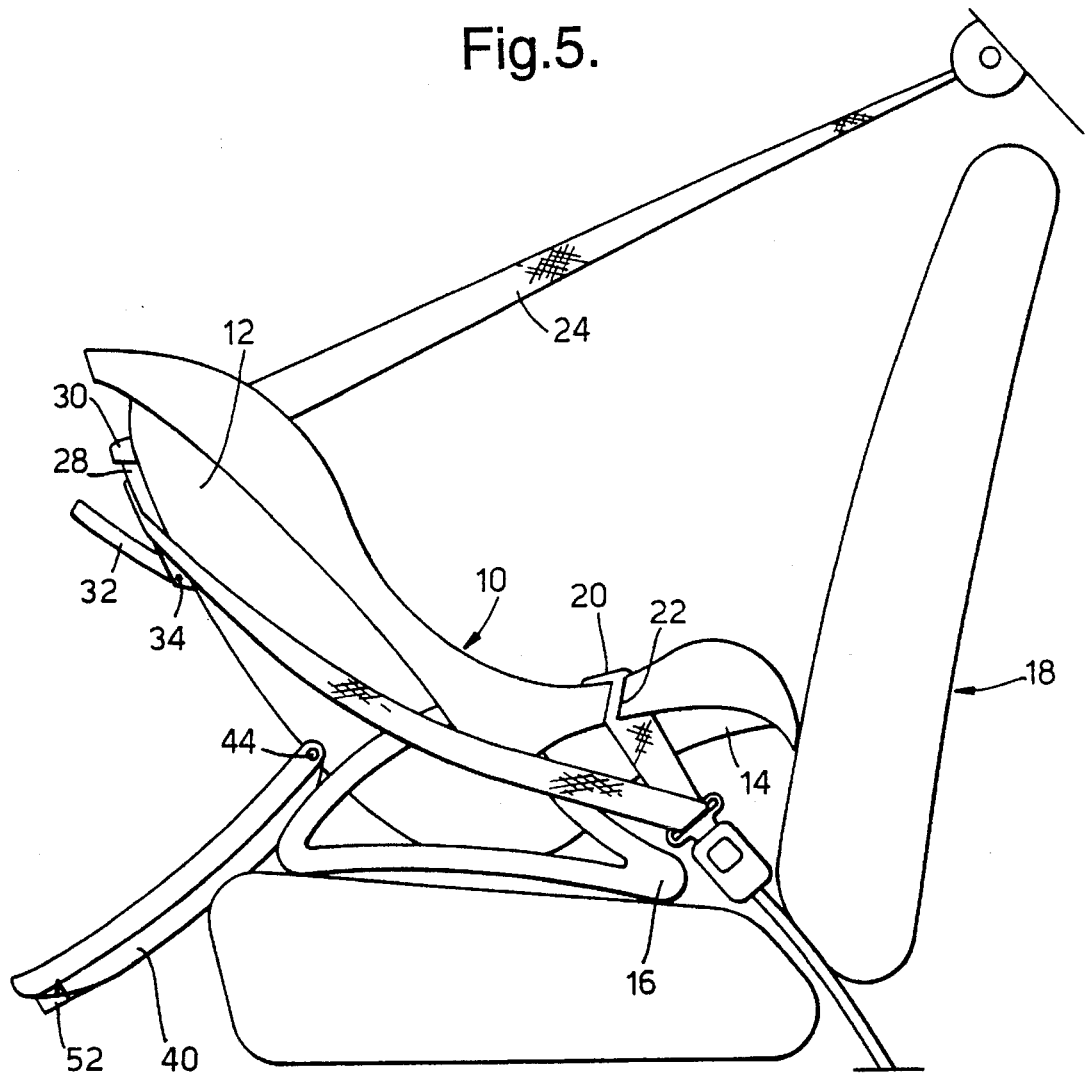
FIG. 5 is a side view similar to FIG. 1 but with the cover open.
Figure 6:
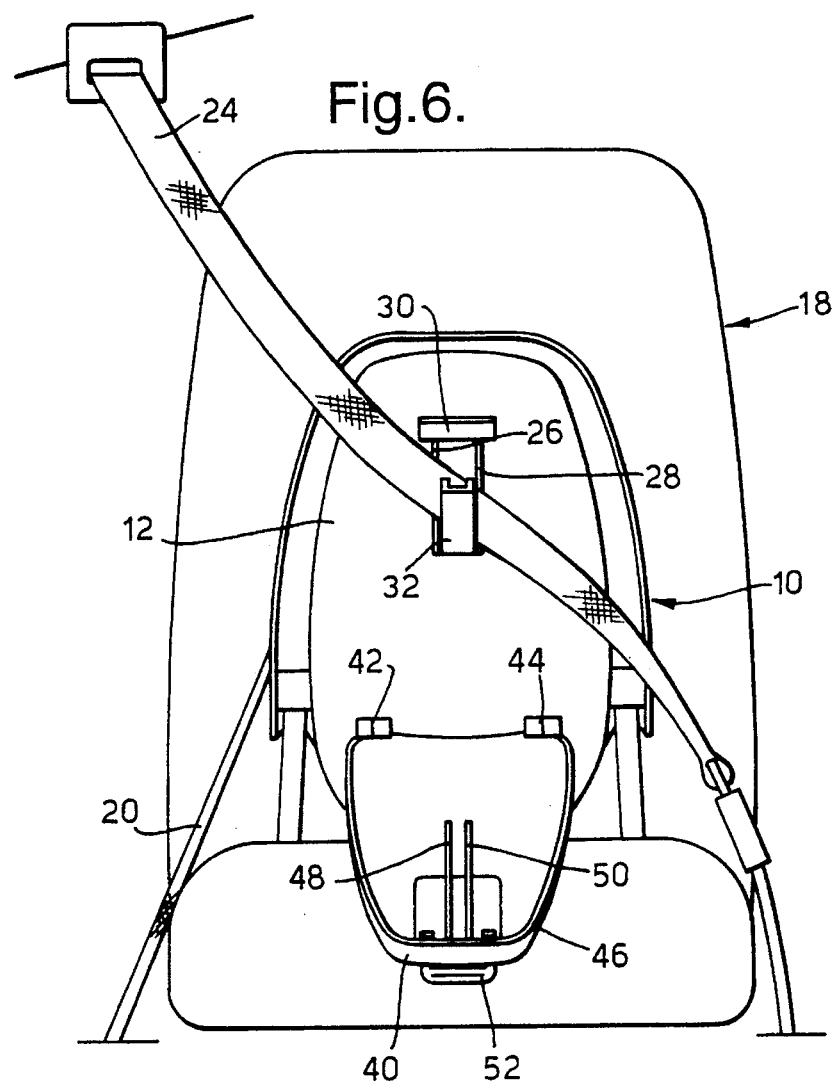
FIG. 6 is a front view similar to FIG. 1 but with the cover open.

During installation, the seat 10 is first positioned on the vehicle seat 18 with its cover 40 open. Next the adult seat belt is fastened, with the shoulder portion 24 thereof positioned so as to lie across the ribs 26 and 28, between the top stop 30 and the clamp member 32, as shown in FIGS. 5 and 6. The cover 40 is then closed and its catch 52 fastened. The ribs 48 and 50 on the inside of the cover 40 press the clamp member 32 between the ribs 26 and 28 on the seat back 12, clamping the shoulder portion 24 therebetween, as shown in FIG. 2.

Figure 7:
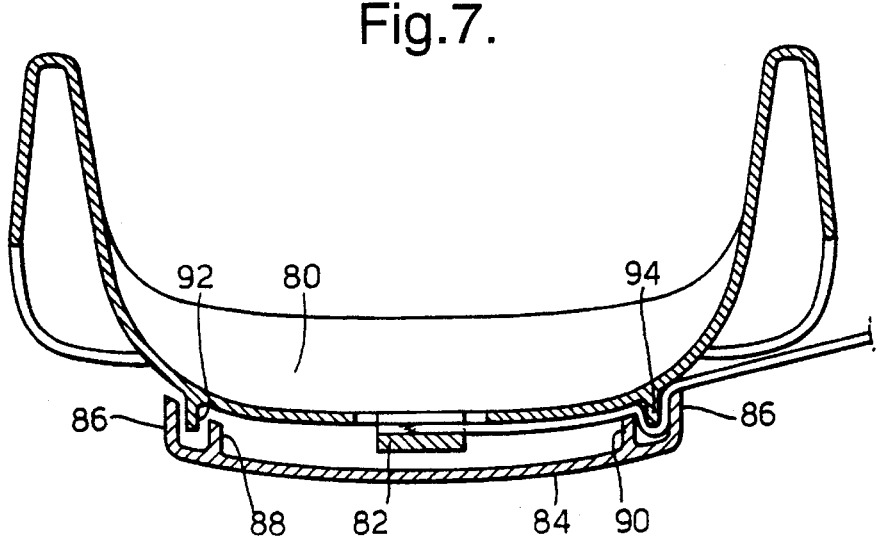
FIG. 7 is a cross-sectional view, similar to FIG. 2, of a second embodiment of the invention.

FIG. 7 shows an alternative embodiment comprising a seat having a seat back 80 with a fixed hook formation 82 (in place of the ribs 26 and 28, top stop 30 and clamp member 32 of FIGS. 1 to 6) for receiving the shoulder portion 24 of the adult seat belt. The seat back 80 has a cover 84 which is similar to the cover 40 of FIGS. 1 to 6 except that it does not have ribs equivalent to the ribs 48 and 50. A flange 86, similar to the flange 46, extends round the side and upper edges of the cover 84. In addition, respective inwardly directed ribs 88, 90 extend parallel to and spaced from the flange 86 on the side edges of the cover 84.

The seat back 80 carries two ribs 92 and 94 which project rearwardly between the flange 86 and respective ribs 88, 90 on the cover 84 when the cover 84 is closed, thus forcing the shoulder portion 24 of the adult belt to follow a sinuous path round the ribs 92 and 94, thereby retaining the shoulder portion 24 securely in the position relative to the seat back in which it was set. The hook formation 82 merely has the function of retaining the belt portion 24 in this position until the cover 84 has been closed.

We claim:

1. An infant safety seat, adapted to be mounted in a vehicle so that a seated occupant faces rearwardly, comprising:

a rigid seat back, a seat portion, guide means on the side of the seat back facing away from the occupant for receiving a shoulder portion of an adult seat belt, clamping means on the side of the seat back facing away from the occupant for inhibiting movement of the shoulder portion of the adult seat belt relative to the seat back, and a cover arranged, when in a closed position to enclose the guide means and to cause engagement of said clamping means, wherein the clamping means comprises first and second clamping elements mounted on the seat back, the first clamping element being movable relative to the second clamping element, and the cover carries camming means for moving the first clamping element into a clamping position relative to the second clamping element, wherein the first and second clamping elements have a plurality of mutually parallel ribs arranged to provide a sinuous path for the shoulder portion so as to increase the friction resisting movement of the shoulder portion relative to the seat back.

* * * * *